United States Patent
Reichel et al.

(10) Patent No.: US 7,599,815 B2
(45) Date of Patent: Oct. 6, 2009

(54) BUILDING MANAGEMENT PERFORMANCE INDEXING AND CONTROL

(75) Inventors: Bryan S. Reichel, Credit River Township, MN (US); James M. Kennedy, Northfield, MN (US)

(73) Assignee: PureChoice, Inc., Burnsville, MN (US)

( * ) Notice: Subject to any disclaimer, the term of this patent is extended or adjusted under 35 U.S.C. 154(b) by 558 days.

(21) Appl. No.: 11/368,911

(22) Filed: Mar. 6, 2006

(65) Prior Publication Data

US 2006/0206273 A1   Sep. 14, 2006

Related U.S. Application Data

(60) Provisional application No. 60/658,449, filed on Mar. 4, 2005.

(51) Int. Cl.
*G06F 17/40* (2006.01)
*G06F 17/00* (2006.01)

(52) U.S. Cl. .................. 702/182; 702/81; 702/1; 702/24; 204/407; 204/406; 204/424

(58) Field of Classification Search ............. 702/182, 702/1, 24, 81, 187
See application file for complete search history.

(56) References Cited

U.S. PATENT DOCUMENTS

| | | | |
|---|---|---|---|
| 5,096,434 A | 3/1992 | Byrne | |
| 5,751,916 A | 5/1998 | Kon et al. | |
| 5,892,690 A * | 4/1999 | Boatman et al. | ............ 700/276 |
| 6,216,956 B1 * | 4/2001 | Ehlers et al. | ................... 236/47 |
| 6,594,621 B1 | 7/2003 | Meeker | |
| 6,782,351 B2 | 8/2004 | Reichel et al. | |
| 6,795,798 B2 | 9/2004 | Eryurek et al. | |
| 6,813,532 B2 | 11/2004 | Eryurek et al. | |
| RE38,985 E * | 2/2006 | Boatman et al. | ............ 700/276 |
| 2002/0144537 A1 | 10/2002 | Sharp et al. | |
| 2003/0014130 A1 | 1/2003 | Grumelart | |
| 2003/0051023 A1 | 3/2003 | Reichel et al. | |

FOREIGN PATENT DOCUMENTS

EP   0710804   5/1996

OTHER PUBLICATIONS

International Search Report and Written Opinion of International Application No. PCT/US2006/007794, filed Mar. 6, 2006, both mailed Jul. 19, 2007.

* cited by examiner

*Primary Examiner*—Hal D Wachsman
(74) *Attorney, Agent, or Firm*—Faegre & Benson LLP

(57) ABSTRACT

A method for measuring compliance with building air quality attribute set points. The method includes the steps of sensing a first attribute of environmental air quality, setting a range of acceptable values for the first attribute, setting a penalty function for the first attribute and comparing sensed data to the first range of acceptable values. The first penalty function is applied as appropriate to assess a first set of points for the first attribute. An index value is created that is a function of the first set of points. In another aspect, the method includes sensing a second attribute, comparing the data against acceptable values and applying a second penalty function as appropriate. The index value is also a function of the second set of points. In yet another aspect, the method includes the step of sensing a first attribute at a second site.

18 Claims, 17 Drawing Sheets

FIG. 6

BUILDING MANAGEMENT PERFORMANCE INDEXING AND CONTROL

This application claims the benefit of U.S. Provisional Application Ser. No. 60/658,449 filed on Mar. 4, 2005.

FIELD OF THE INVENTION

The present invention is related to monitoring the environment within the interior of a building or buildings. More specifically, the present invention is related to monitoring certain parameters of air in one or more buildings.

BACKGROUND OF THE INVENTION

The typical approach to providing satisfactory air quality in work spaces or living spaces is to measure conditions in the space. The measured values are then compared with safe, recommended or desired environmental air quality conditions. Due to the complexity of buildings, including the number of rooms and the types of conditions that might be present, the amount of data that is created may be overwhelming and hard to interpret. What is needed is a way to provide an easy to understand measure of overall air quality and building management performance.

SUMMARY OF THE INVENTION

The invention is directed toward a method for measuring compliance with building air quality attribute set points. In one aspect of the invention a first attribute of environmental air quality is measured at a first site over a given period of time. A range of acceptable values for the first attribute is determined and the data collected is compared with the range of acceptable values. In the event that the sensed data is out of the acceptable range, a penalty function is invoked to assess a first set of points for the data that is out of acceptable range. An index value is created over time that is a function of the first set of points.

In another aspect of the invention a second attribute is measured and is similarly compared against an acceptable range of values. A second penalty function is invoked to assess a second set of points for any data that is out of the acceptable range of values for the second attribute. The index value is also a function of the second set of points. In yet another aspect of the invention, a first attribute is measured at a second site and similarly compared against acceptable ranges, with a penalty function invoked as appropriate.

BRIEF DESCRIPTION OF THE DRAWINGS

FIG. 6 is a spreadsheet showing a sample set of data and a resulting index number.

DETAILED DESCRIPTION OF THE INVENTION

Figure 1:
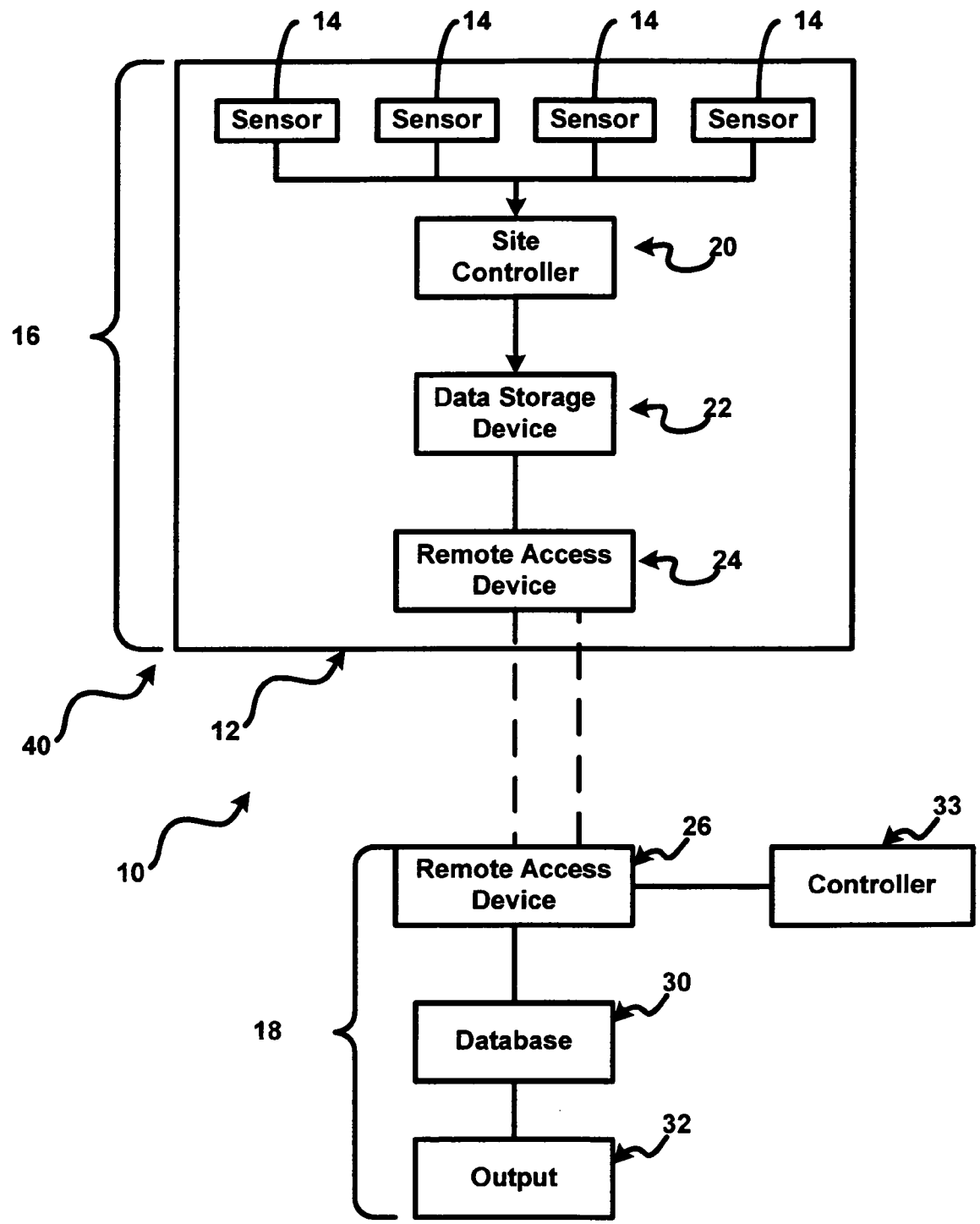
FIG. 1 is a schematic diagram of an air quality monitoring system measuring air quality of a particular site according to one embodiment of the invention.

Referring to FIG. 1 thereshown is a schematic diagram of an environmental monitoring system 10 for monitoring the indoor air quality of a particular site 12 within building 40 according to one embodiment of the invention. The system 10 includes a site monitoring assembly 16 located at site 12 and a remote data collection system 18 capable of communication with the site monitoring assembly 16. The site monitoring assembly 16 is a data acquisition system that includes a site controller 20, one or more sensors 14 coupled to the site controller, a data storage device 22, and a remote access device 24. Each sensor 14 measures one or more air quality parameters and is in electrical communication with the site controller 20. The site controller 20 is likewise coupled to a data storage device 22, which is capable of storing data collected from the sensors 14.

The site controller 20 initiates the collection of data from sensors 14 and stores the data in data storage device 22. The data storage device 22 is an electronic storage medium such as a disk, flash memory, a data logger, or other acceptable media for storing data acquired from sensors 14. Site controller 20 can request data from the sensors 14 at predefined intervals or in response to an input from an operator provided to site controller 20. The site controller 20 can be programmed to collect information from the sensors 14 at any interval. For example, site controller 20 may collect information at one given interval continuously. Alternatively, the site controller 20 may collect information at differing intervals, for example, to collect additional data during differing times of the day, week, or month. The time intervals may be programmed either at the site 12 or, alternatively, remotely by providing programming information to the site controller through the remote access device 24. Data stored in the data storage device 22 from each sensor includes identification information to identify from which sensor the data was collected. For example, data collected from one of the sensors 14 may be designated as data from sensor "a," data collected from another sensor may be designated as data from sensor "b," and so forth. In addition, data collected from the sensors 14 would include time stamp information to identify when the data was collected.

Remote access device 24 is capable of communication with external devices or systems such as data collection system 18 to provide access to data collected by the site monitoring assembly 16 and stored in the data storage device 22. Remote access device 24 can be a modem, Internet connected processor, wireless network connection or any other device or communication structure capable of communicating data externally from the site monitoring assembly 16.

The remote data collection system 18 is, in one embodiment, physically separate from the site monitoring assembly 16 and is a facility for systematically collecting, storing, and analyzing data from site monitoring assembly 16. While remote data collection system 18 is shown as being located outside of the building 40, it should be appreciated that the remote data collection system can be located within the building without departing from the scope of the invention. The remote data collection system 18 includes a remote access device 26 capable of receiving data from the remote access device 24, a database 30, and an output device 32. The database 30 is a comprehensive, centralized data storage system database for storing data from site monitoring assembly 16. The remote access device 26 of the remote data collection assembly 18 is designed to electronically communicate with the remote access device 24 of the site monitoring assembly 16 or otherwise access information provided by the site monitoring assembly 16 to download data collected by the sensors 14 of the site monitoring assembly to database 30.

Figure 1A:
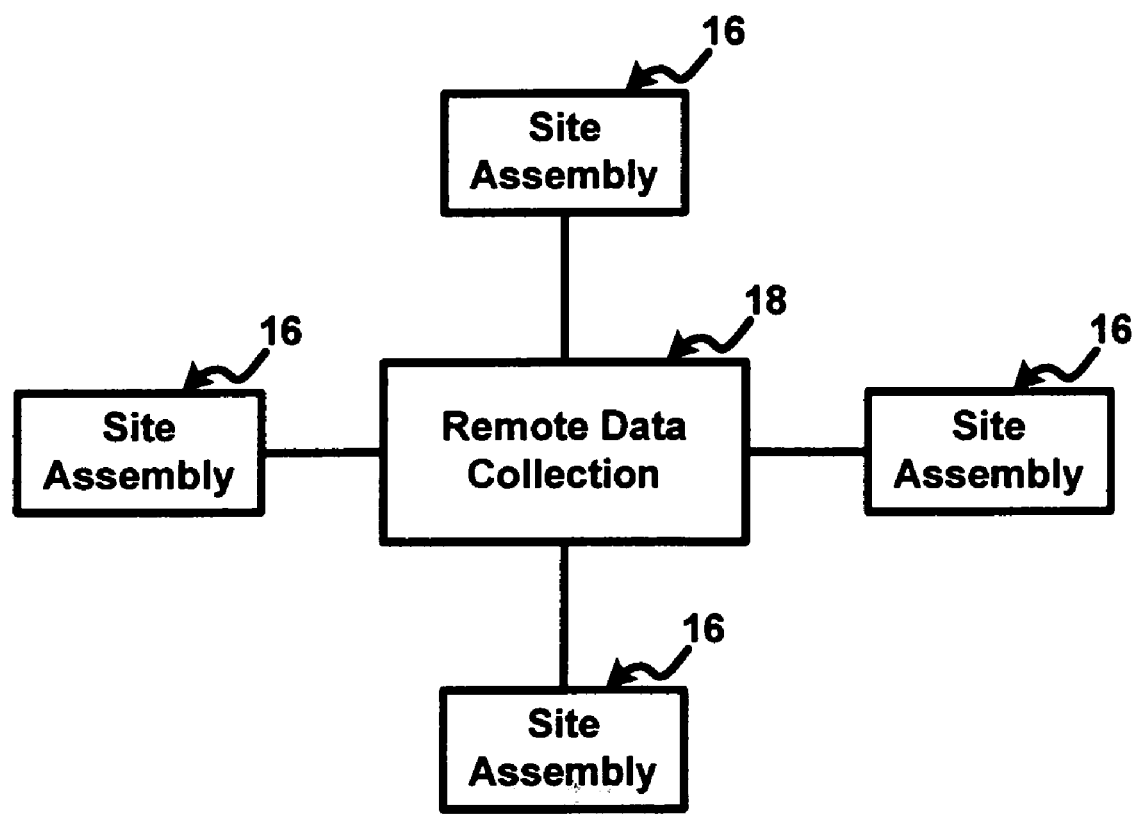
FIG. 1A is a schematic diagram illustrating the air quality monitoring system of FIG. 1 having a plurality of sites from which air quality measurements are provided.

The remote data collection system 18, in one embodiment, includes a system controller 33 for initiating access to one or more site monitoring assemblies 16. The environmental monitoring system 10 of FIG. 1 illustrates a single site monitoring assembly 16, but the environmental monitoring system can have a plurality of site monitoring assemblies, as shown in FIG. 1A. The remote data collection system 18 is capable of communication with any number of site monitoring assemblies 16 located at various sites 12 within building 40 to download data collected by each of the site monitoring assemblies. The system controller 33 of the remote data collection system 18 is programmed to access various site monitoring assemblies 16 at defined intervals to download data from the various site monitoring assemblies 16, which may be stored in each of their respective data storage devices 22. Alternatively, in another embodiment of the invention, individual site controllers 20 of various site monitoring assemblies 16 may initiate access to the remote data collection system 18 to upload data to the remote central database 30 of the remote data collection system.

The data collected from each of the site monitoring assemblies 16 at the various data acquisition sites 12 is stored in the database 30 with identification information that indicates the source of the data. For example, data collected from one of the site monitoring assemblies 16 can be designated as being from site monitoring assembly "A," data collected from another one of the site monitoring assemblies can be designated as being from site monitoring assembly "B," and so forth. Thus, each data point collected will, in one embodiment, include sensor identification information (for example, "a"), assembly or site information (for example, "A"), time stamp information as well as the air quality measurement. Thus, any information stored in the database 30 can be accessed by the particular site and sensor from which it was collected.

The output device 32 coupled to database 30 of the remote data collection system 18 may be a printer or a removable data storage device (e.g. floppy disk or a CD ROM disk). The remote data collection system 18 may manage data for the sites and provide periodic reports of air quality, in printed form, by disk or via electronic communication (e.g. e-mail, the Internet, radio frequency communication, telephone) for review and analysis.

Additionally, the remote database 30 may be connected to a distributed wide area network (e.g. Internet.) so that the database 30 can be directly accessed for review by personnel at individual sites 12. Preferably, accessibility of the data on a wide area network would be limited by pass codes to protect the confidentiality of the data. Only authorized personnel from each site 12 would be able to access the data from a particular site 12 by using the correct pass code.

Figure 1B:
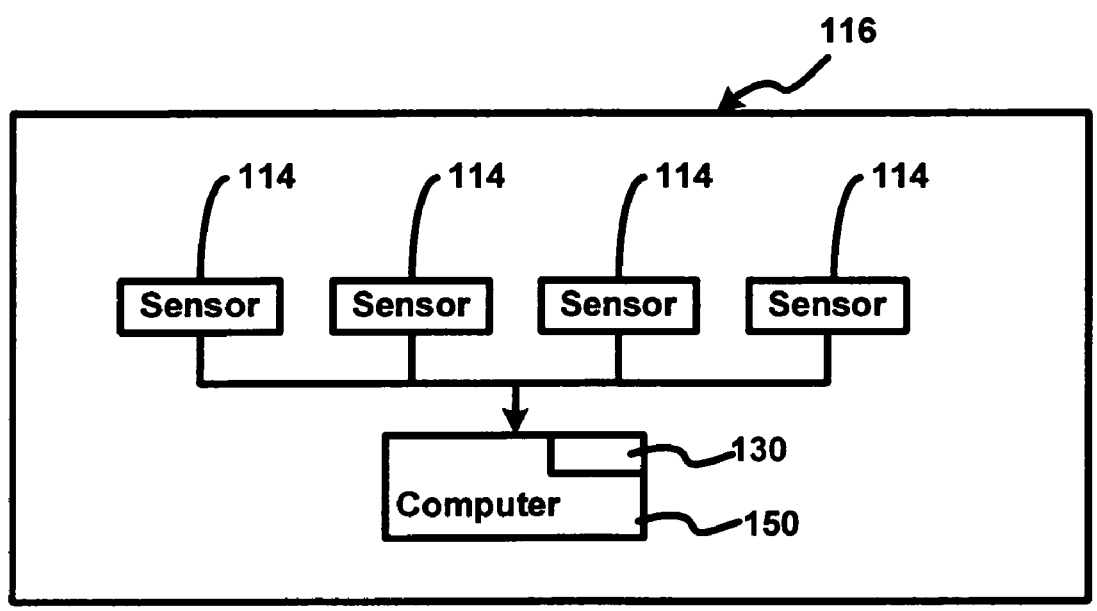
FIG. 1B is a schematic diagram illustrating a site monitoring assembly of an air quality monitoring system according to another embodiment of the invention.
Figure 1C:
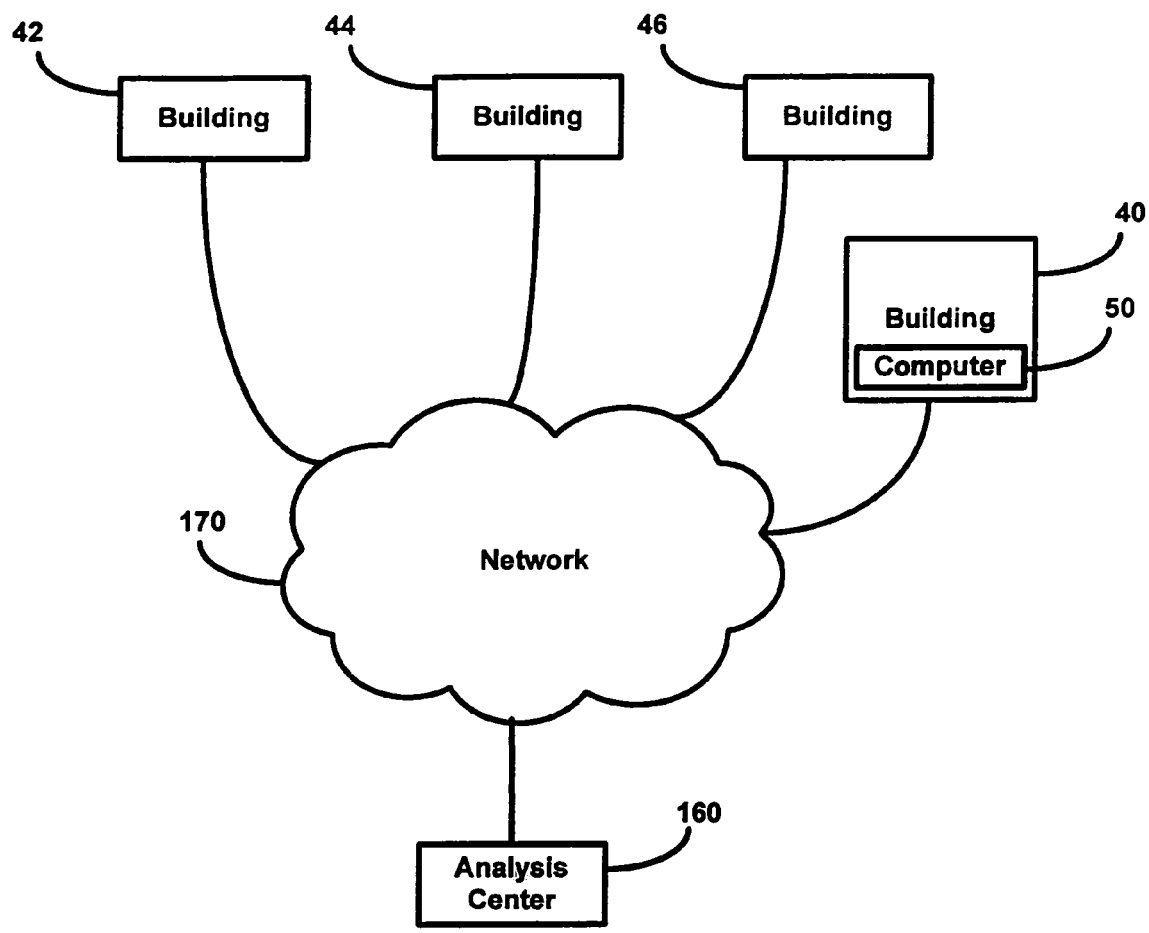
FIG. 1C is a schematic diagram of a communication structure for relaying data collected by the site monitoring assembly of FIG. 1B to a remote data analysis system.

FIG. 1B illustrates a site monitoring assembly 116 for an environmental monitoring system 110 according to another embodiment of the invention. Site monitoring assembly 116 includes one or more sensors 114 in electrical communication with a computer 50 having a database 130. Computer 150 can request data from the sensors 114 at predefined intervals and store that information directly into database 130. Thus, in this embodiment, no long term storage device such as the data storage device 22 described above is required to store data. Rather, data collected from the sensors 114 is stored directly into the database 130. The computer 150 may have data analysis software to perform analysis on the database. Alternatively, as is shown in FIG. 1C, the computer 150 may be connected to a remote analysis center 160, via a computer network 170 such as the Internet to provide data to the analysis center. In addition, other buildings 42, 44, 46, and 48 may have site monitoring assemblies capable of electronic communication via the computer network 170 or other electronic communication to download data to the analysis center 160 for analysis and/or reporting.

Figure 2:
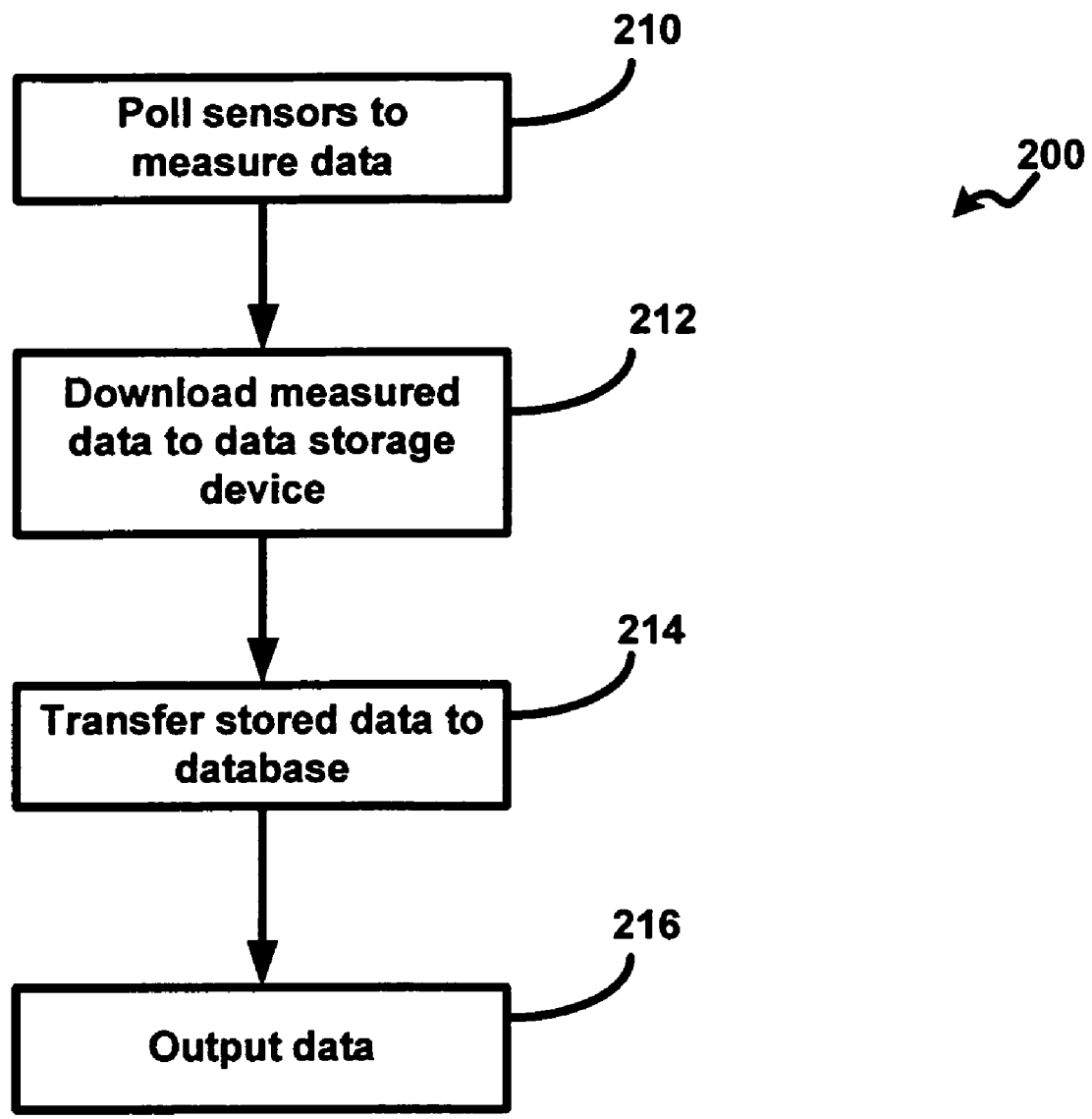
FIG. 2 is a functional flowchart illustrating a method of sensor data collection by the air quality management system of FIG. 1 according to one embodiment of the invention.

FIG. 2 is a functional flow chart 200 illustrating operation of the system of FIG. 1 according to one embodiment of the invention. As illustrated by block 210, site controller 20 polls one or more sensors 14 to request data from the sensors at selected time intervals to measure air quality and download the measured data to the data storage device 22 as illustrated by block 212. The rate at which data is polled from the sensors 14 depends upon the configuration of the site controller 20. As discussed above, the site controller can request data at regular intervals, in response to user inputs, or at varying intervals, depending upon the particular time of day, week, or month. Further, individual sensors 14 within the system may be polled at different times or rates. The polling rates may be preprogrammed into the site controller 20. Alternatively the site controller 20 may include a user interface for inputting the rate for polling sensors 14 or the polling rates may be remotely programmed by sending polling information to the site controller via the remote communication device 24.

As illustrated by block 214, data is downloaded or transferred from the data storage device 22 of each site monitoring assembly 16 to the remote database 30. This data transfer may be initiated by the remote data collection system 18 or the site monitoring assembly 16 (or data acquisition system), either automatically or manually. Either the site controller 20 or controller 33 may be programmed to automatically initiate the transfer of data from the data storage devices 22 of the site monitoring assemblies 16 at each site 12 to the central remote database 30. The transferred data from the site monitoring assembly 16 is stored in the database 30 with a site identification number. The frequency at which data is downloaded to the central database 30 depends upon the rate at which data is polled from the sensors 14 and preferably is a variable that may be programmed into the system as desired. As illustrated by block 216, the data can then be outputted to a particular site in the form of a printed report, e-mail, or other electronic communication.

As previously explained, the environmental data collected by the sensors 14 may be analyzed for controlling air quality or may be used for maintaining air quality records. For example, the data may be used to set maintenance priorities, help plan and justify capital expenditures, plan and budget predictive maintenance and determine the frequency at which filtering devices, which are used to filter residues from the air, need to be changed.

Sensors 14 may be positioned at various distributed locations in a particular site 12. The collection of sensors 14 at any given site may be referred to as a sensor cluster. The number of sensors shown in FIG. 1 is for illustrative purposes only and the number of sensors can vary per cubic foot depending upon the air quality monitoring precision required. In one embodiment, a fixed system of sensors is used where a plurality of sensors 14 are fixedly mounted to walls or other surfaces at a particular site 12 and are operably wired or are otherwise in communication with the site controller 20 and data storage device 22 for systematically and continuously collecting air quality data at the site 12. Alternatively, the sensors 14 employed may be mobile sensors. The mobile sensors may be communication with a site controller 20, similar to fixed sensors, but can be placed in various and changing locations. Communications can be via wired or wireless connections.

Various types of sensors 14 may be employed for testing various air quality attributes. In one embodiment, the system 10 employs a particle sensor and a volatile organic compound sensor. Alternatively or in addition, other sensors 14 in a sensor cluster at a particular site 12 can measure smoke, carbon monoxide, temperature, humidity or the presence of foreign substances, such as toxins or other chemicals. This list is for illustrative purposes, and is not intended to be limited to the particular sensors described. Generally, any sensor that can sense environmental quality attributes may be used.

Figure 3:
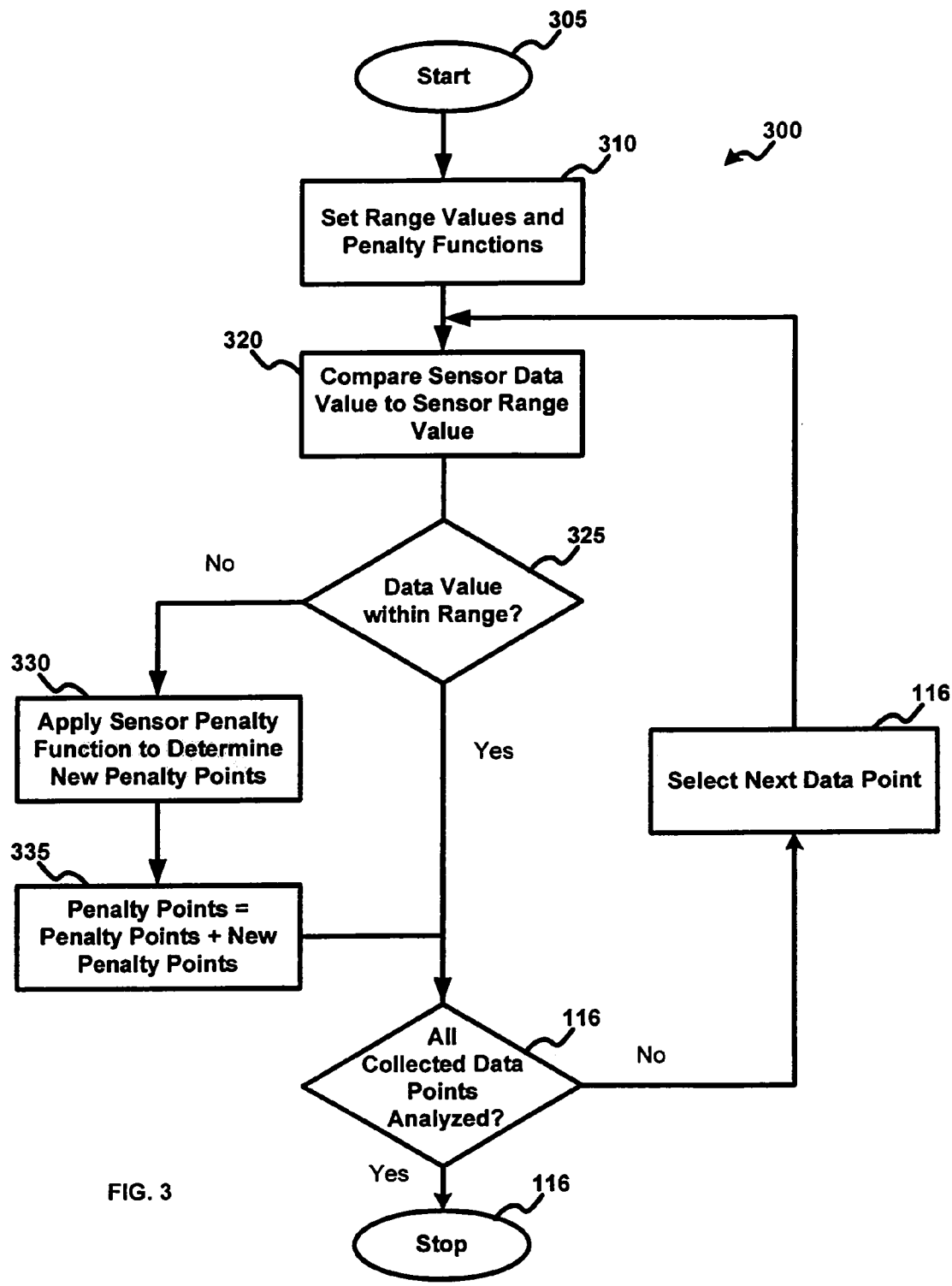
FIG. 3 is a functional flowchart illustrating a method of analyzing an air quality attribute by comparing individual sensor data points previously collected as shown in FIG. 2 against defined data range values according to one embodiment of the invention.

FIG. 3 is a functional flowchart 300 of a process for calculating an index number for an individual sensed attribute such as, for example, room temperature, according to one embodiment of the invention. The process of FIG. 3 assumes that some or all of the data to be analyzed has already been collected (and is thus ready to be analyzed) while allowing for some of the data to be collected in parallel with the process. After starting at block 305, values are assigned to describe a range over which an attribute can vary under normal conditions. Next a penalty function for a value varying outside of the range in block 310 is set. More than one range may be assigned for each particular attribute and more than one penalty function may apply to data outside a selected range. For example, the range for room temperature may be set to one range during a weekday, another during a weeknight and yet another on a weekend. Penalty functions may vary similarly. As an example, a room temperature range may be set at 70° F.±2° F. The penalty function may be set so that 1 penalty point is assessed for each 1 degree that the actual sensed temperature is outside the range. In a preferred embodiment, only whole points are assessed. As another example, for humidity, an example range would be 32.5% relative humidity±7.5%. A representative penalty function would be one penalty point for each 5% the actual sensed humidity is outside the range. For carbon dioxide ($CO_2$), a possible range would be 825 parts per million±375 parts per million. An example penalty function would be one penalty point for each 200 ppm that the actual sensed $CO_2$ is outside the range. For carbon monoxide (CO), a possible range would be 25 parts per million+2 parts per million. A possible penalty function would be one penalty point for each 1 part per million that the actual sensed CO is outside the range.

Next, at block 320, a previously collected sensor value is compared to the proper range for that type of value (and for the time at which the data is taken). At decision block 325, if the sensed value is outside the range for that particular type of value, then the proper penalty function is applied at block 330 and a number of new penalty points for the particular attribute is determined. The new penalty points are added to a running penalty points total in block 335 to create a new running penalty points total for the attribute. The process then advances to block 340. If, however, the sensed value is within the range, the process moves directly to step 340 and no new penalty points are assigned. At decision block 340, the process determines whether all of the previously collected data points have been analyzed. If all of the previously collected data points for all of the different sensor attributes have been analyzed, then the process ends at block 355. If all previously collected data points have not been analyzed, the process continues to block 350, where a new data point is selected. That data point is then compared to its applicable range in block 320 and the process continues as described above.

Figure 3A:
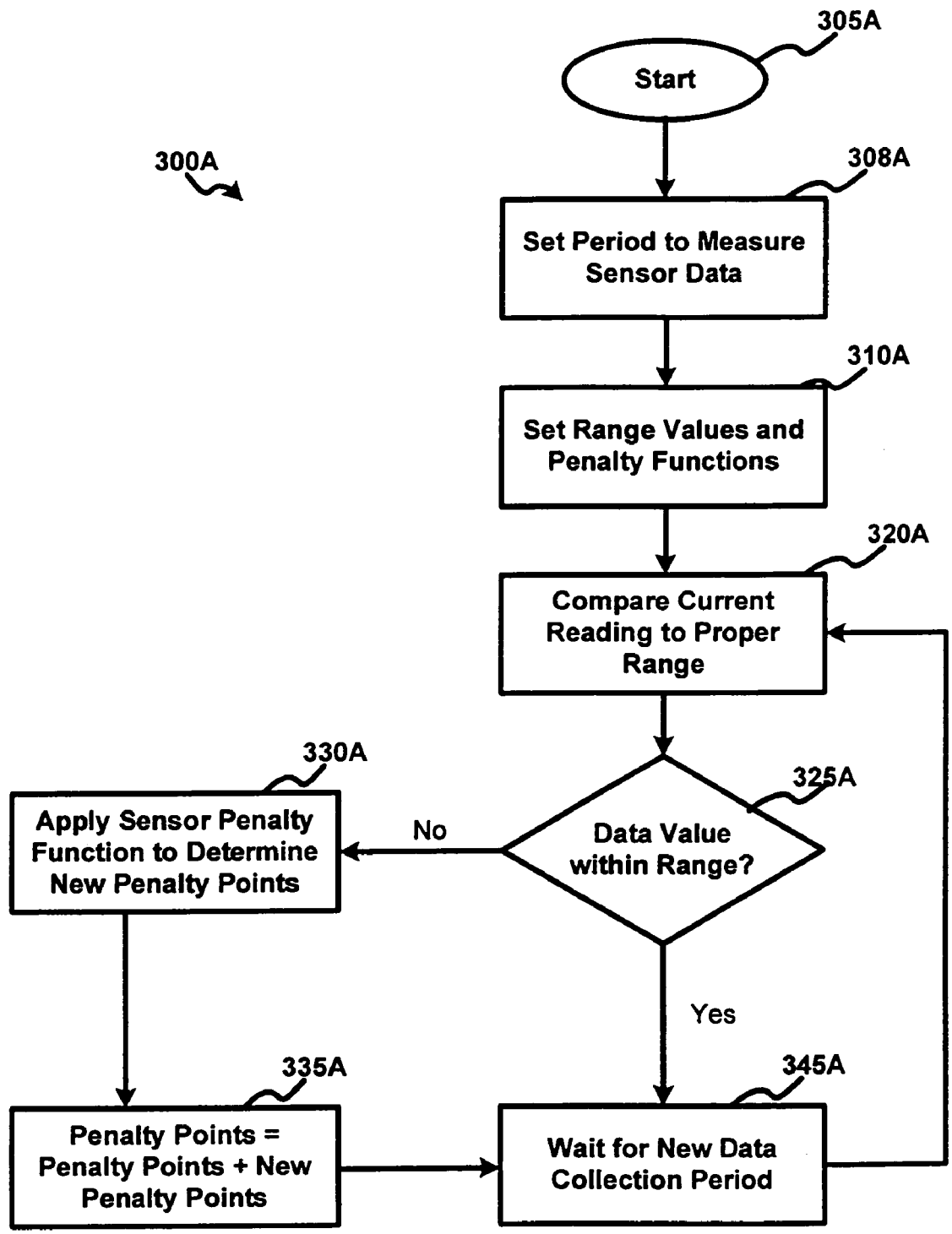
FIG. 3A is a functional flowchart illustrating a method of analyzing an air quality attribute by comparing individual sensor data points against defined data range values as they are collected according to another embodiment of the invention.

Referring now to FIG. 3A, thereshown is a flowchart 300A of an alternative process for determining an instantaneous penalty point amount for a sensed attribute. This process is similar to the process in FIG. 3 except that each data point may be analyzed at or near the time that the data is taken. After starting at block 305A, the process sets a period for taking data in block 308A. The range and penalty functions described above in relation to flowchart 300 are then set in block 310A. At block 320A, the current reading of an attribute value is then compared to the proper range. At decision block 325A, if the current reading is outside the proper range, then the proper penalty function is applied to generate new points in block 330A and the running points total is updated in block 335A before waiting for a new period to begin in block 345A and looping back to block 320A. If the current reading is inside the range, then the process moves directly forward to block 345A.

Figure 3B:
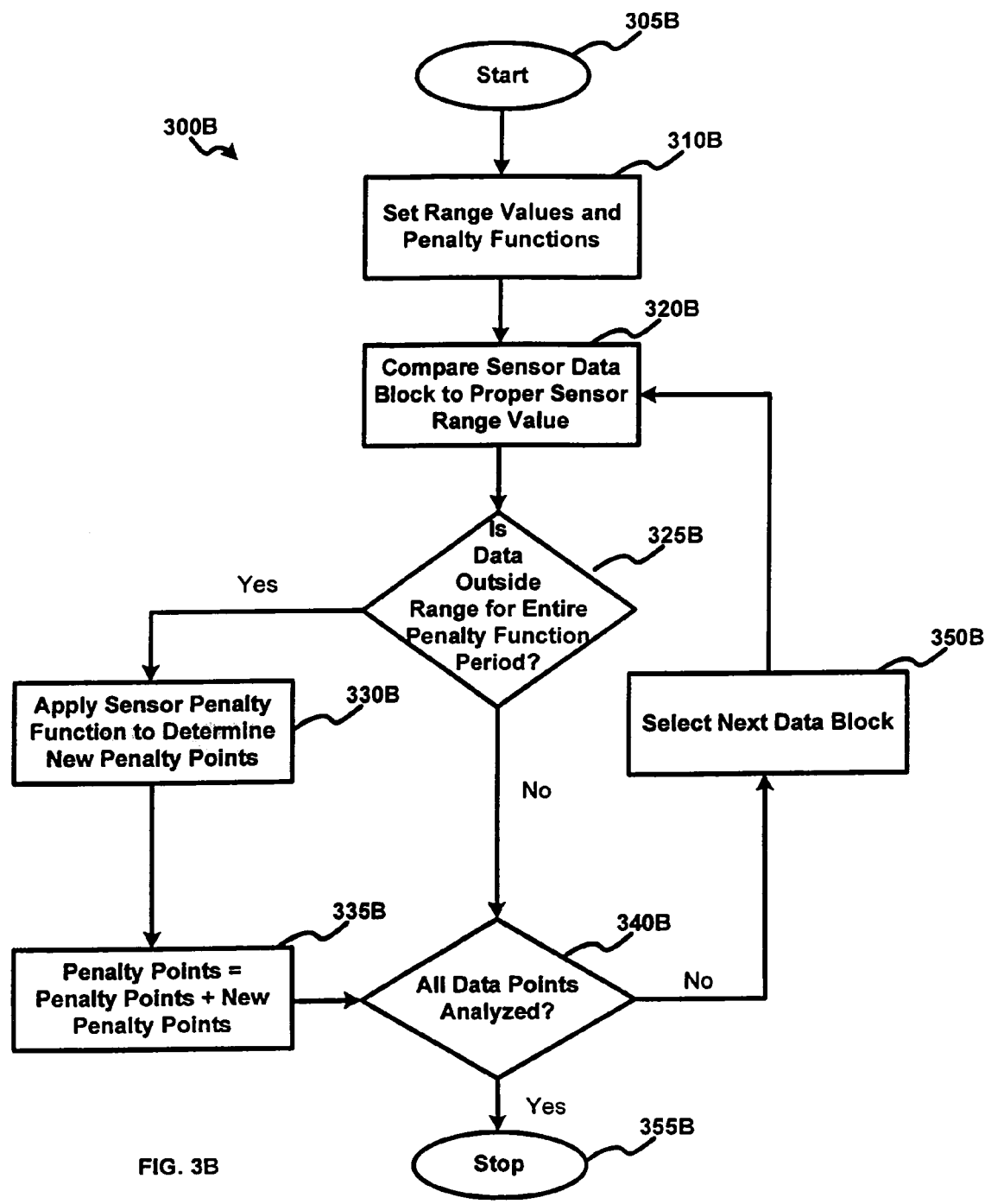
FIG. 3B is a functional flowchart illustrating a method of analyzing an air quality attribute by comparing a block of sensor data points previously collected over time against defined data range values according to another embodiment of the invention.

Referring now to FIG. 3B, thereshown is a method for analyzing data over a predetermined time period according to another embodiment of the invention. Here, data points may be taken more frequently and larger groups of data may be analyzed together to give a more complete picture of facility performance. For example, data points may be taken every minute and then an hour's worth of data may be compared to the proper range to determine whether a sensed reading was outside the range for a predefined period of time. This process again assumes that some or all of the data points have already been taken (similar to FIG. 3) while some of the data points may be collected as the process continues. The process begins at block 305B. At block 310B, data ranges and penalty functions are set. As above, the data ranges may have a clock time component and the penalty functions may have clock time and duration components in addition to a value component. For example, a room temperature range may be set at 70° F.±2° F. for weekdays and 64±2° F. for other times. The penalty function may be set so that 1 penalty point is assessed for each 1 degree-hour that the actual sensed temperature is outside the range. For humidity, an example range would be 32.5% relative humidity±7.5%. A representative penalty function would then be one penalty point for each 5% per hour the actual sensed humidity is outside the range. For $CO_2$, a possible range would be 825 parts per million±375 parts per million for weekdays and 600 parts per million±150 parts per million for other times. An example penalty function would be one penalty point for each 100 parts per million per hour that the actual sensed $CO_2$ is outside the range. For CO, a possible range would be 25 parts per million+1 part per million. A possible penalty function would be one penalty point for each 1 part per million per hour that the actual sensed CO is outside the range.

At block 320B, sensed values over the selected time period are compared to the proper range for that type of and time value. If the sensed value is outside the range for that type of value for the entire time period, then the proper penalty function is applied at block 330B and a number of new penalty points is determined. The new penalty points are added to a running points total in block 335B to create a new running points total for the sensed attribute. If the sensed value is not outside the range for that type of value for the entire time period, then the process moves directly to decision block 340B to determine whether all of the data points in a data collection have been analyzed. If not, the process selects a next set of data points for analysis at block 350B and returns to block 320B. If so, the process ends at block 355B.

Figure 3C:
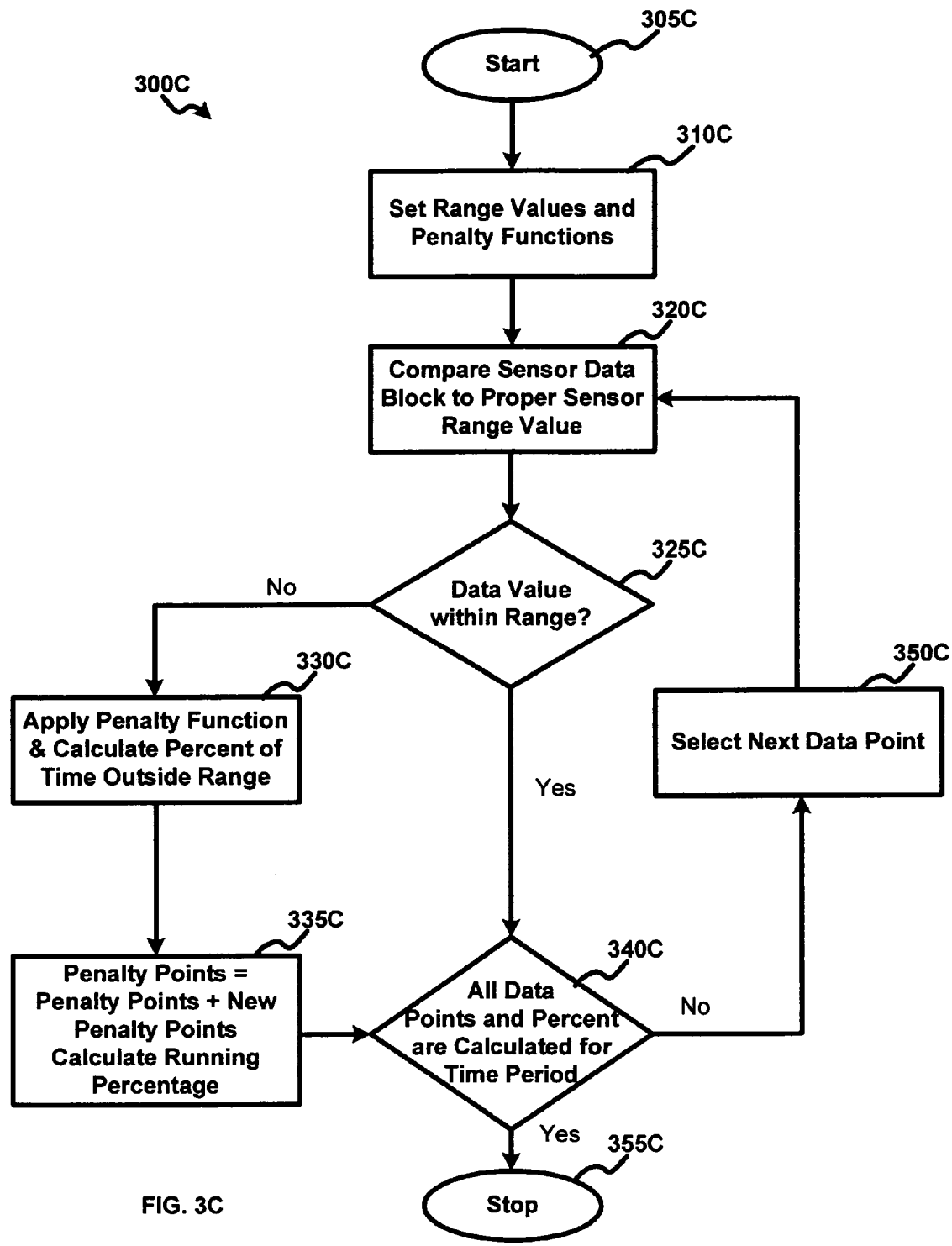
FIG. 3C is a functional flowchart illustrating a method of analyzing an air quality attribute by comparing a block of sensor data points previously collected over time against defined data range values according to yet another embodiment of the invention.

Referring to FIG. 3C, thereshown is flowchart 300C illustrating a method for analyzing data collected over a predetermined time period according to another embodiment of the invention. This process again assumes that some or all of the data points have already been taken (similar to the method illustrated in FIG. 3) while some of the data points may be collected as the process continues. The process begins at block 305C and moves to block 310C where ranges and penalty functions are set. Here, ranges may have a clock time component and the penalty functions may have a clock time and duration component to them in addition to a value component. For example, a room temperature range may be set at 70° F.±2° F. for weekdays and 64±2° F. for other times. The penalty function may be set so that 1 penalty point is assessed for each 1 degree-hour that the actual sensed temperature is outside the range. For humidity, an example range would be 32.5% relative humidity±7.5%. A representative penalty function would then be one penalty point for each 5% per hour the actual sensed humidity is outside the range. For $CO_2$, a possible range would be 825 parts per million±375 parts per million for weekdays and 600 parts per million±150 parts per million for other times. An example penalty function would be one penalty point for each 100 parts per million per hour that the actual sensed $CO_2$ is outside the range. For CO, a possible range would be 25 parts per million+1 parts per million. A possible penalty function would be one penalty point for each 1 parts per million per hour that the actual sensed CO is outside the range.

Next, at block 320C, sensed values over the selected time period are compared to the proper range for that type of and time value. If the sensed value is outside the range for that type of value at decision block 325C, then the proper penalty function is applied at block 330C and a number of new penalty points is determined for a given sensed attribute. The amount of time that a parameter is inside or outside of the parameter range is also determined and tracked at block 330C and an instantaneous percentage determined. The new penalty points are added to a running points total in block 335C to create a new running points total for the sensed attribute. The instantaneous percentages may also be tracked and a running percentage number generated.

If the sensed values are inside the range for the entire time period, then the process moves directly to step 340C to determine whether all of the data points in a data collection and percentages have been analyzed. If not, the process selects a next set of data points for analysis at block 350C and returns to block. If so, the process ends at block 355C.

Figure 4A:
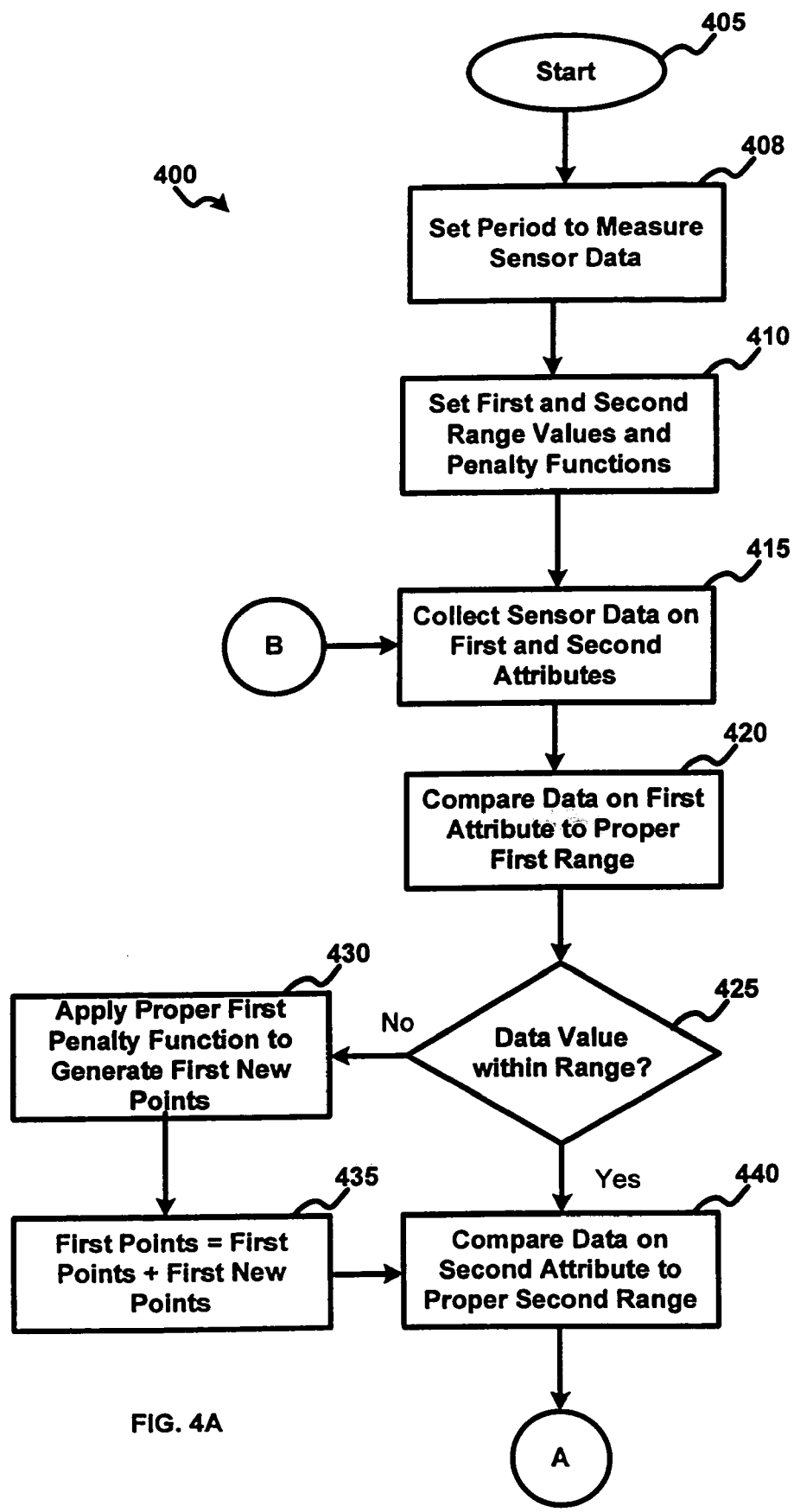
FIGS. 4A-4B are a functional flowchart illustrating a method of analyzing air quality by comparing individual sensor data points previously collected over time that measure a plurality of attributes against defined data range values according to another embodiment of the invention.
Figure 4B:
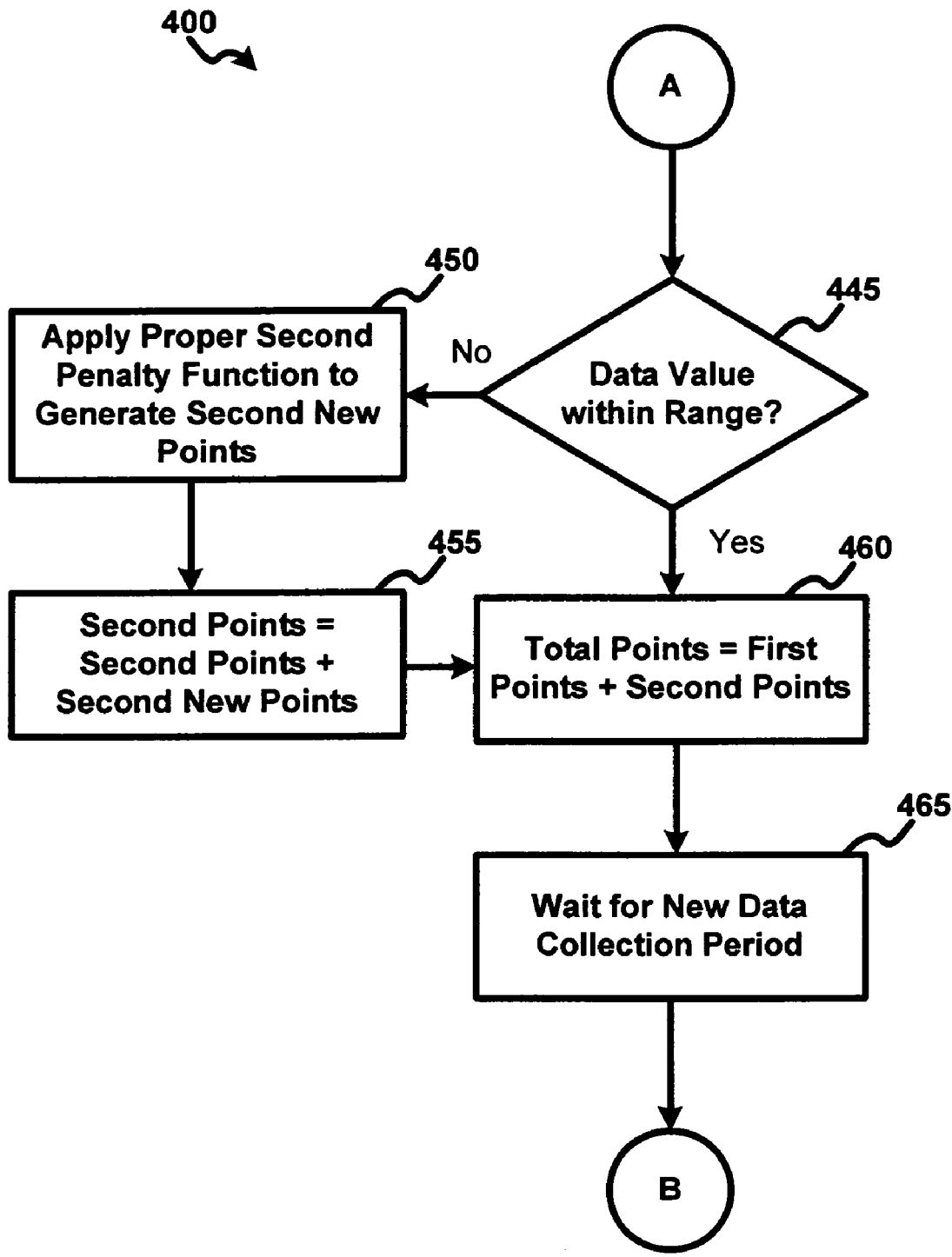

Referring now to FIGS. 4A-4B, thereshown is a flowchart 400 of a process for calculating an index where more than sensed attribute is used in formulating the index according to another embodiment of the invention. This process assumes that data will be collected as part of the process. After starting at block 405, the period for study is set in block 408. The first and second ranges and first and second penalty functions are then set in block 410. In block 415, the data is then collected. In block 420, a collected value of the first attribute is compared to the proper first range. At decision block 425, if the collected sensor data is outside the proper first range, the process applies the proper first penalty function to create first new points in block 430 and a new running first points total for the sensed attribute is created in block 435 before the process continues to block 440. If, however, the data is inside the range, then the process to continues directly from decision block 425 to block 440.

In block 440, a collected sensor data value of the second attribute is compared to the proper second range. If the value is outside the range then decision block 445 directs the process to apply the proper second penalty function to generate second new points at block 450 and then a new running second points total is generated in block 455 for the second attribute before returning to block 460. If the value is inside the range, the process proceeds directly from decision block 445 to block 460. In block 460, a total points calculation is made for the two attributes by summing the running total of the first points and the running total of the second points. At block 465 the process waits for a new data collection period to begin before returning to block 415.

Figure 4C:
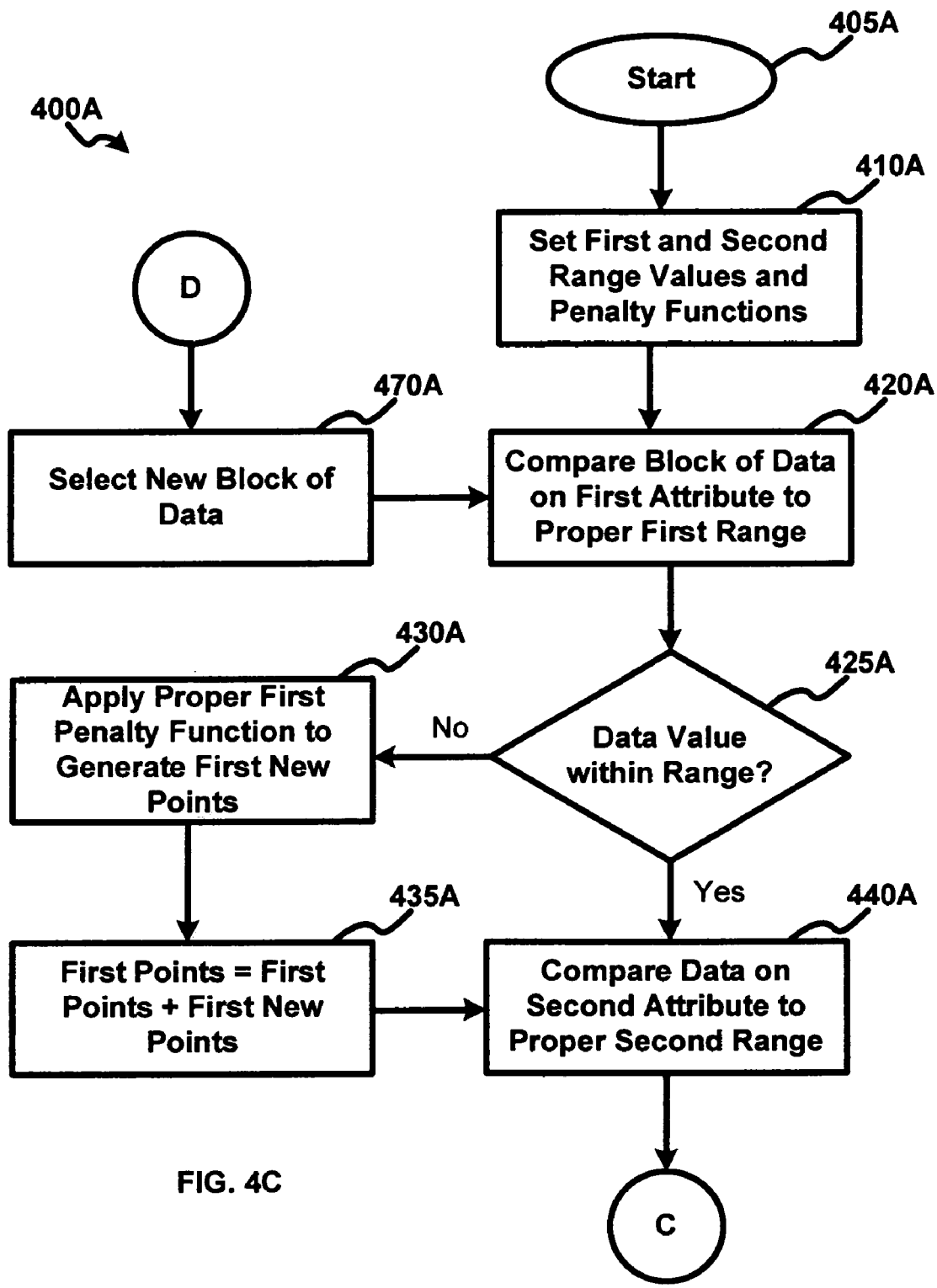
FIGS. 4C-4D are a functional flowchart illustrating a method of analyzing air quality by comparing a block of sensor data points previously collected over time that measure a plurality of attributes against defined data range values according to another embodiment of the invention.
Figure 4D:
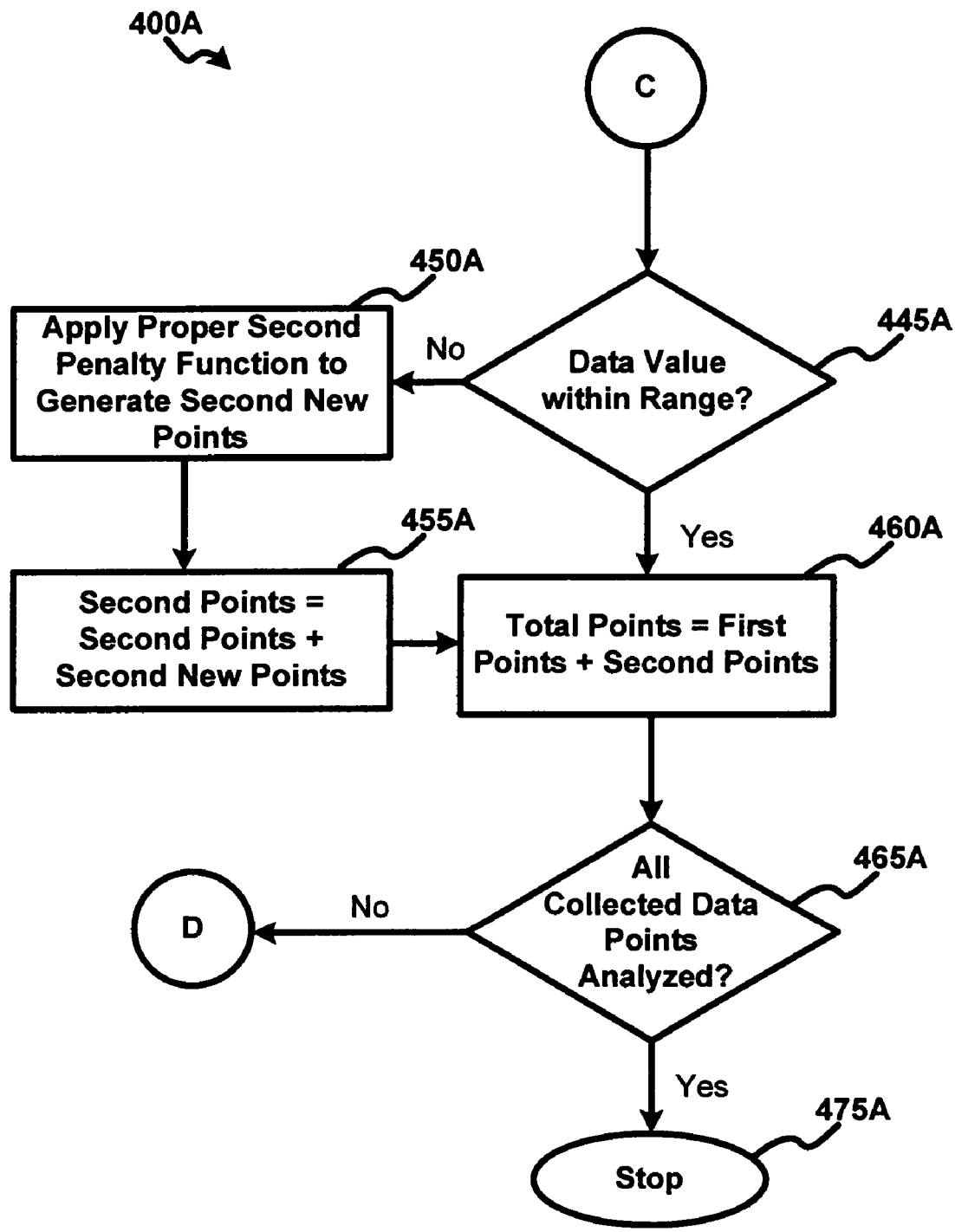

Referring now to FIGS. 4C-4D, thereshown is a flowchart 400A illustrating a process according to another embodiment of the invention where it is assumed (as described above in relation to the process illustrated in FIG. 3) that some or all of the data has been collected prior to the start of the process, while allowing for more data to be collected once the process has begun. After starting at block 405A, the first and second ranges and first and second penalty functions are then set in block 410A. In block 420A, a previously collected value of the first attribute is compared to the proper first range. At decision block 425A, if the collected sensor data is outside the proper first range, the process applies the proper first penalty function to create first new points in block 430A and a new running first points total for the first sensed attribute in block 435A before 440A. If the data is inside the range, then the process to continues directly from decision block 425A to block 440A.

In block 440A, a collected sensor data value of the second attribute is compared to the proper second range. If the value is outside the range then decision block 445A directs the process to apply the proper second penalty function to generate second new points at block 450A. Subsequently, a new running second points total is generated in block 455A before the process continues to block 460A. If the value is inside the range, however, the process proceeds directly from decision block 445A to block 460A. At block 460A, a total points calculation is made for the two attributes by summing the running total of the first points and the running total of the second points. At decision block 465A, the process determines whether all of the data points in a data collection have been analyzed. If not, the process selects a next set of data points for analysis at block 470A and returns to block 420A to begin the process again as described above. If so, the process ends at block 475B.

Figure 4E:
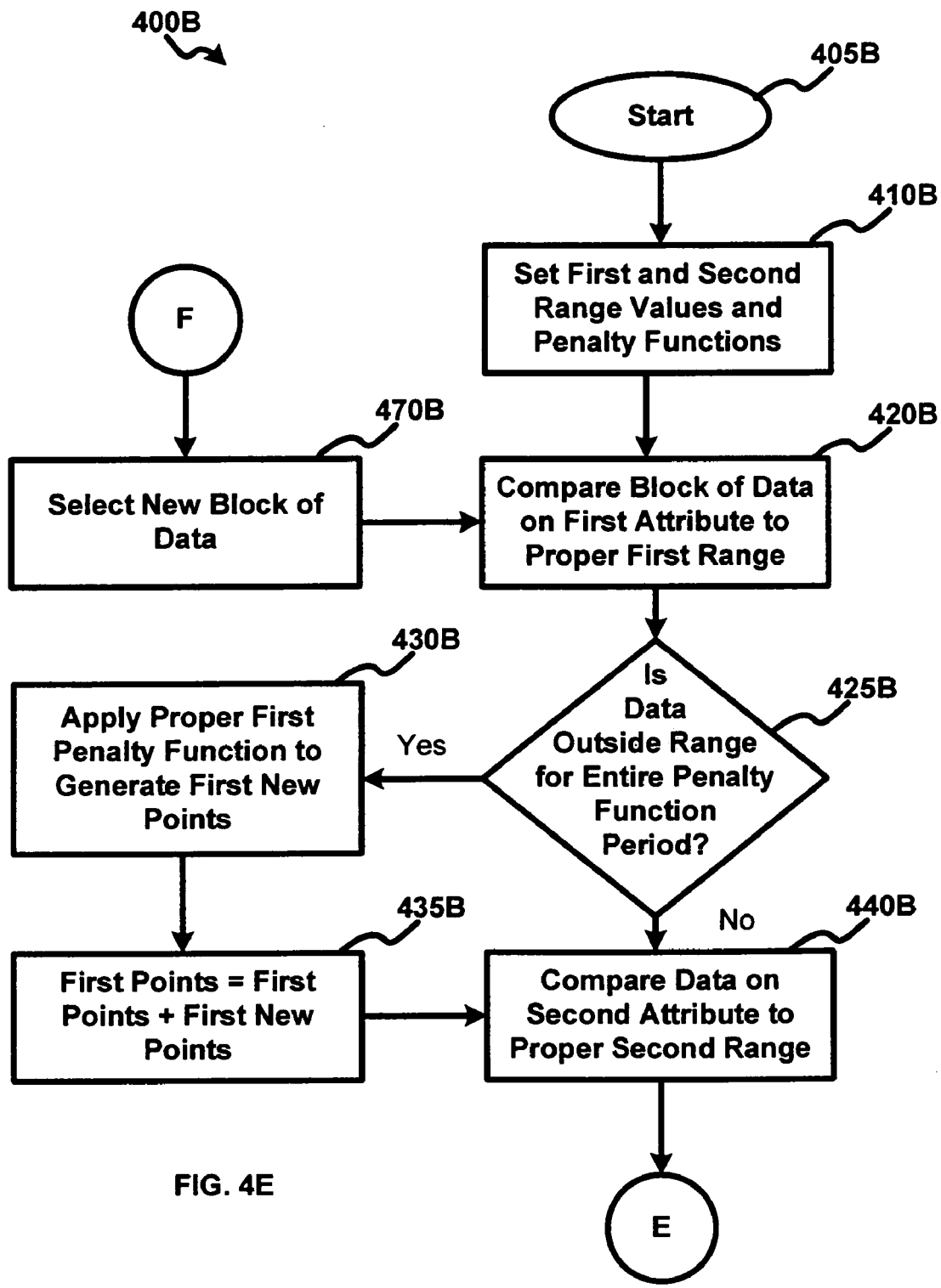
FIGS. 4E-4F are a functional flowchart illustrating a method are a functional flowchart illustrating a method of analyzing air quality by comparing a block of sensor data points previously collected over time that measure a plurality of attributes against defined data range values according to yet another embodiment of the invention.
Figure 4F:
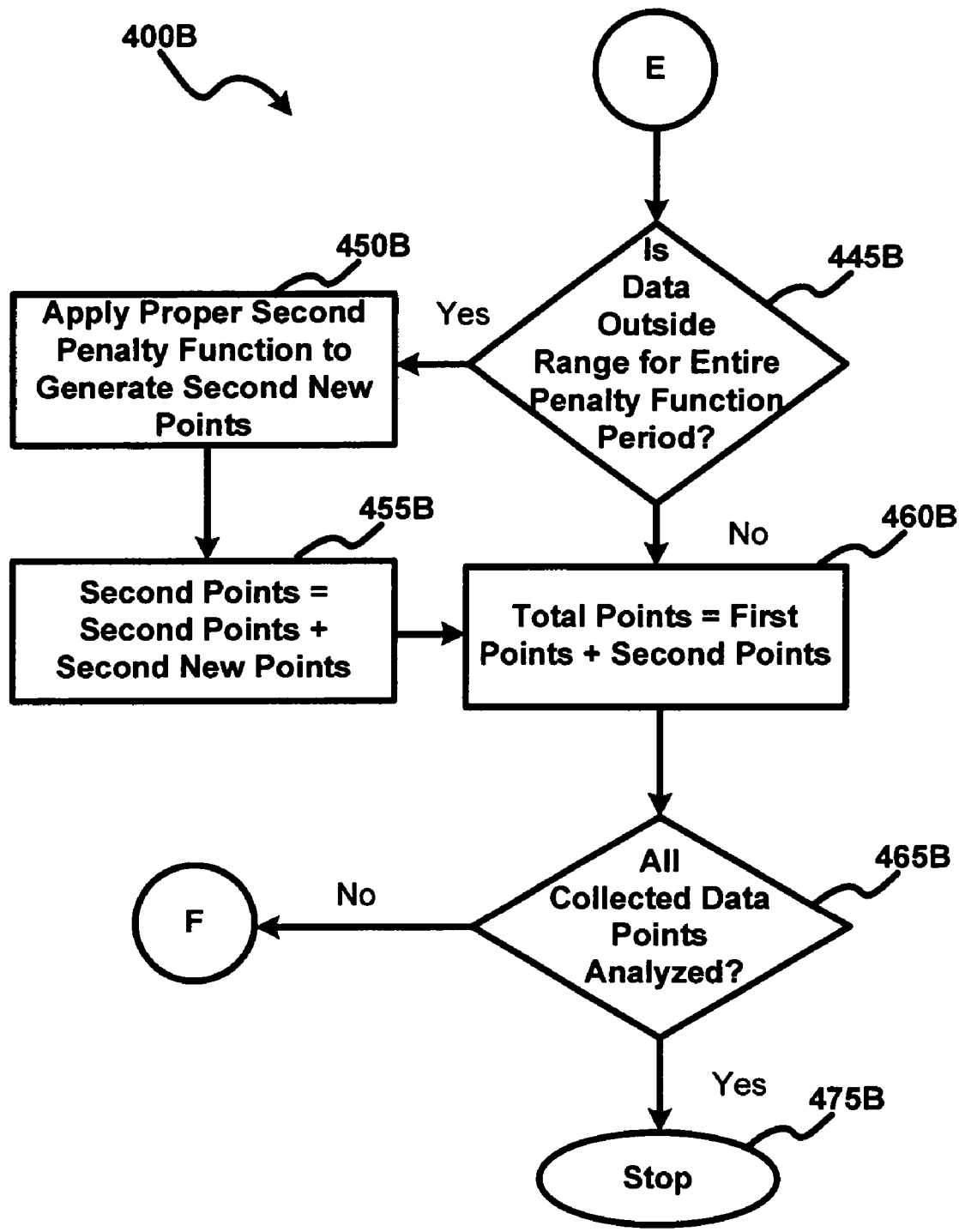

Referring now to FIGS. 4E-4F, thereshown is a flowchart 400B illustrating a process according to another embodiment of the invention where it is assumed (as described above in relation to the process illustrated in FIG. 3) that some or all of the data has been collected prior to the start of the process, while allowing for more data to be collected once the process has begun. The embodiment illustrated in FIGS. 4E-4F is similar to the process described above and illustrated in flowchart 400A of FIGS. 4C-4D. This process allows for multiple attributes as in the other process, but also allows for analysis of data over time similar to the process illustrated in FIG. 3B. After starting at block 405B, the first and second ranges and first and second penalty functions are then set in block 410B. In block 420B, a previously collected value of the first attribute is compared to the proper first range. At decision block 425B, if the collected sensor data is outside the proper first range for the entire length of time covered by the data analyzed, the process applies the proper first penalty function to create first new points in block 430B for the first sensed attribute and a new running first points total in block 435B before returning to block 440B. Otherwise, the process to continues directly from decision block 425B to block 440B. The primary difference between the process illustrated in flowchart 400B as compared to the process illustrated in flowchart 400A is that the process illustrated in flowchart 400B requires that the data block fall outside the proper range for the entire period of interest before the penalty function is applied.

In block 440B, a collected sensor data value of the second attribute is compared to the proper second range. If the value is outside the range for the entire period of interest, then decision block 445B directs the process to apply the proper second penalty function to generate second new points for the second sensed attribute at block 450B. Subsequently, a new running second points total is generated in block 455B before the process continues to block 460B. Otherwise, the process proceeds directly from decision block 445B to block 460B. At block 460B, a total points calculation is made for the two attributes by summing the running total of the first points and the running total of the second points. At decision block 465B, the process determines whether all of the data points in a data collection have been analyzed. If not, the process selects a next set of data points for analysis at block 475B and returns to block 420B to begin the process again as described above. If so, the process ends at block 475B.

Each of the processes described above with respect to flowcharts 400, 400A and 400B describe a process having two attributes. It is to be understood, however, that a system can have more than two attributes. If additional attributes are to be analyzed using one the processes illustrated in flowcharts 400, 400A and 400B, additional loops similar to blocks numbered 425-430-435 for each flowchart can be added for each attribute and block 460 can be modified to sum the points applied for the additional attributes.

Figure 5:
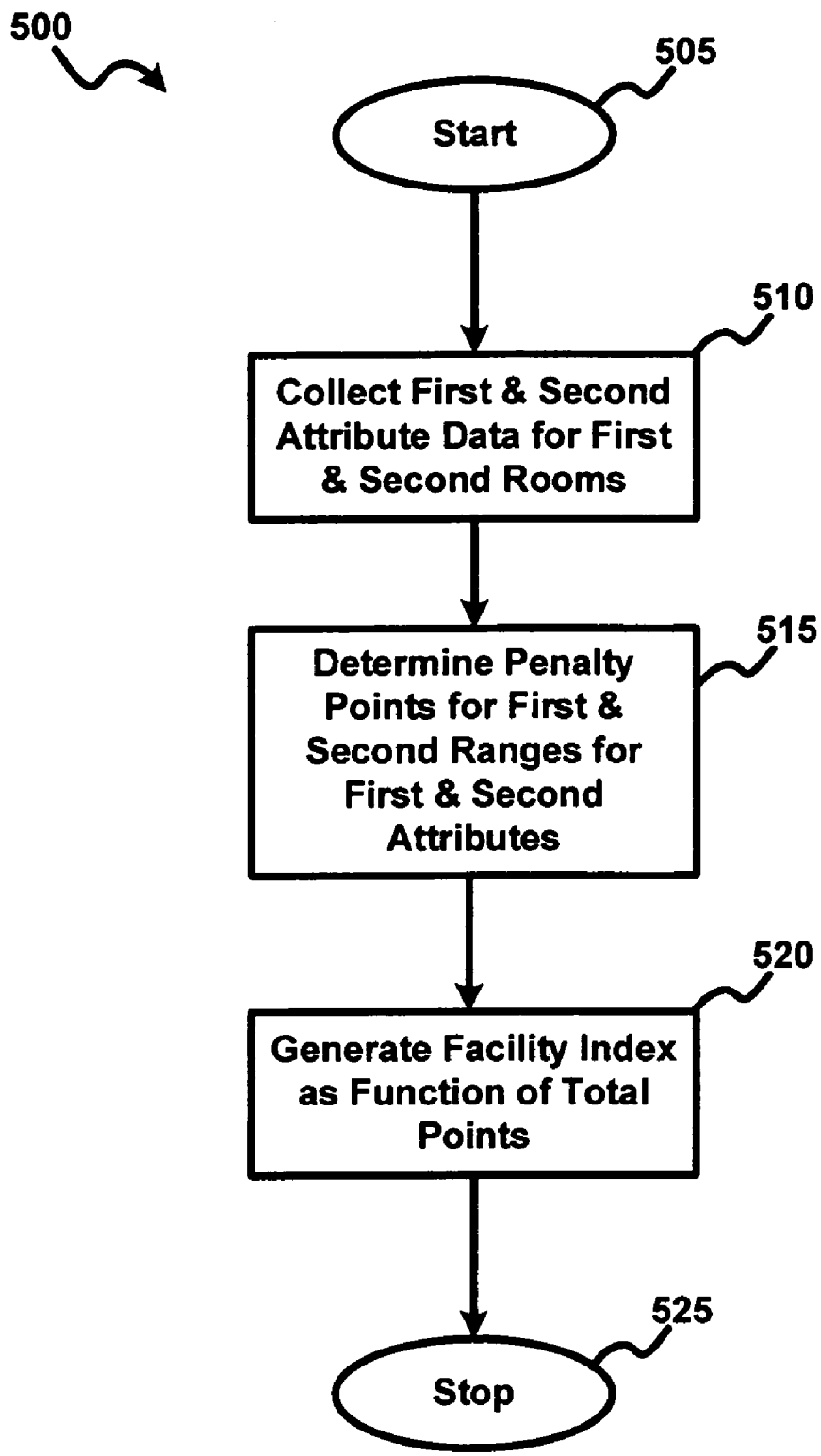
FIG. 5 is a functional flowchart illustrating a method of calculating a facility performance index according to one embodiment of the invention.

Referring now to FIG. 5, thereshown is a flowchart 500 of a process for calculating a facility performance index where two or more attributes are used and two or more sensors are used to collect data for each attribute. In one example, two different kinds of sensors measuring two different attributes are in each of at least two rooms. After starting at block 505, the process moves to block 510 where data is collected for each sensor for each room. Penalty points may be assessed per attribute and per sensor (using the any of the processes described above with respect to flowcharts 300, 300A, 300B, 400, 400A and 400B) as specified in block 515. A facility index may then be generated in block 520. The facility index may be a function of the points assessed per attribute, per room, per sensor, or some combination of these. The facility index provides a single value to describe the air quality in a particular facility and thereby gives an indication of the overall performance of the building. The process then ends in block 525.

Figure 6:
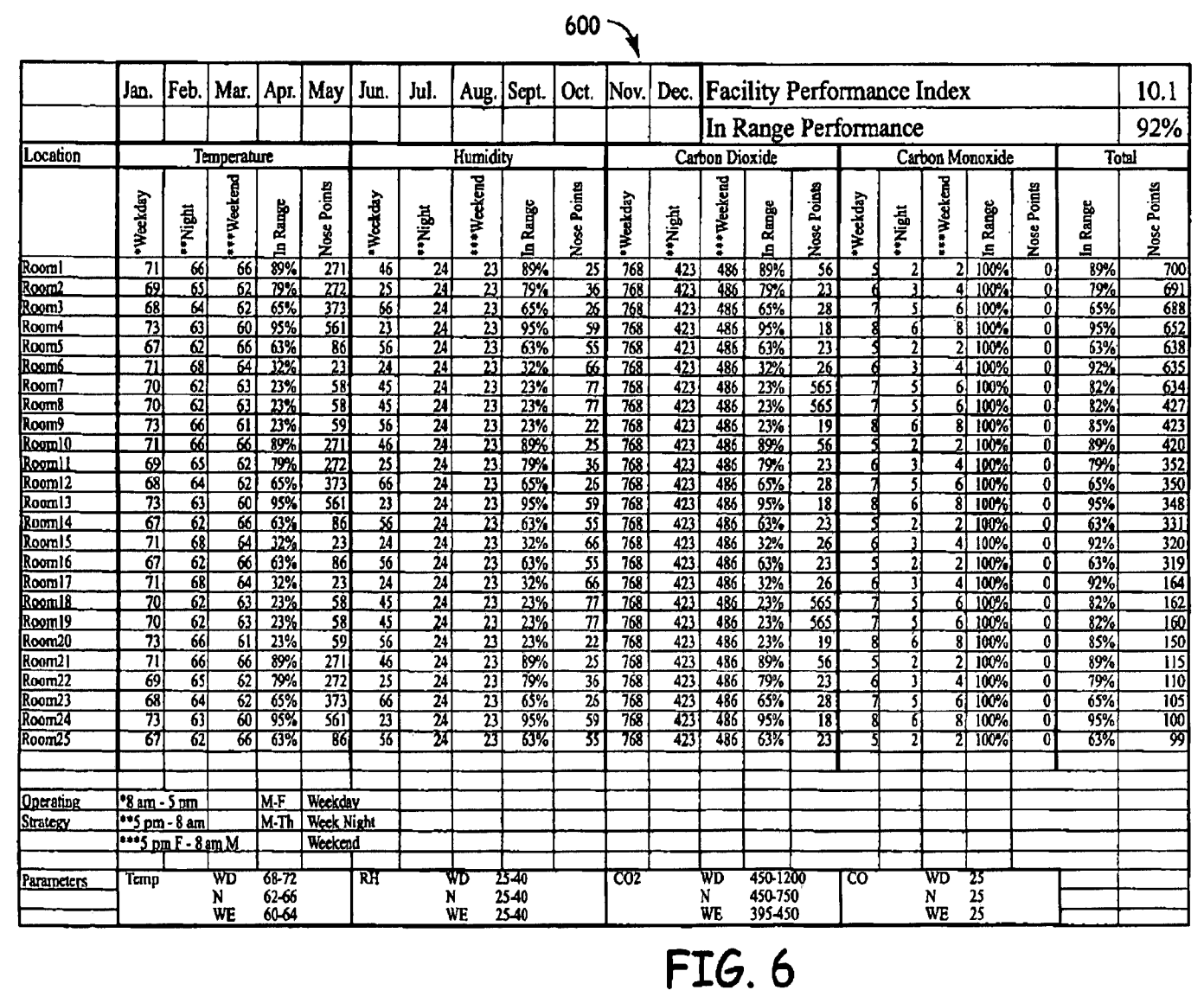

Referring now to FIG. 6, thereshown is a spreadsheet of data from a data acquisition system that was used to generate a facility performance index according to one embodiment of the invention. As described in FIG. 2, after data is transferred to the database as is identified in block 214, the data is output into a form for use as is identified in block 216. The data shown in spreadsheet 600 provides output data from a monitoring system that includes measured attributes of temperature, humidity, carbon dioxide and carbon monoxide collected in 25 rooms over a one month time frame. Average values during the selected time frames are shown. The data was divided into weekday, night and weekend collections and penalty points separately applied to each collection of data in accordance with the appropriate penalty function. As can be seen from the bottom of the spreadsheet, the weekday period was 8 am-5 pm Monday-Friday. The Weeknight period was from 5 pm-8 am Monday-Friday. The weekend period was from 5 pm Friday through 8 am Monday. The temperature range varied with the periods: weekday range was 68-72 degrees, night range was 62-66 degrees and the weekend range was 60-64 degrees. Relative humidity and carbon dioxide also had ranges that varied with the period. Carbon monoxide had a fixed range through all periods (although it could have been allowed to vary). The spreadsheet shows points calculated for each individual room for each attribute. The spreadsheet also calculates total points for each room across attributes.

One method of calculating the final facility index is to add up all of the points then divide the points by the number of sensor points (e.g. one set of sensors per room) and divide by the number of days of data that are collected. This will give an indication of the amount of deviation of each space on each day from the set ranges. This method allows the direct and accurate comparison of different rooms, times and buildings for meaningful analysis. The spreadsheet shown in FIG. 6 can be implemented using macros in a spreadsheet program such as Microsoft Excel. The index value along with the Percent in Range number indicate frequency and magnitude of building performance infractions as compared against the desired operating parameters.

Various modifications and additions can be made to the embodiments discussed above without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for measuring compliance with building air quality attribute set points, comprising the steps of:
   sensing a first attribute of air quality with an air quality sensor at a first site;
   setting a first range of acceptable values for the first attribute;
   setting a first penalty function for the first attribute;
   comparing the sensed first attribute to the first range of acceptable values and applying the first penalty function to assess a first set of points for the first attribute; and
   creating an index value that is a function of the first set of points.

2. The method of claim 1, further comprising the step of storing data from the air quality sensor related to the first attribute from the sensing step and wherein the step of comparing the sensed first attribute to the first range of acceptable values includes comparing the stored data against the first range of acceptable values.

3. The method of claim 1, further comprising the step of storing data from the air quality sensor related to the first attribute from the sensing step and wherein the step of comparing the sensed data for the first attribute to the first range of acceptable values includes comparing a block of the stored data against the first range of acceptable values and wherein the step of applying the first penalty function includes applying the first penalty function if the entire block of stored data is outside the first range of acceptable values.

4. The method of claim 1, further comprising the step of storing data from the air quality sensor related to the first attribute from the sensing step, wherein:
   the step of storing data from the sensing step includes storing a time stamp;
   the step of setting a first range of acceptable values for the first attribute includes setting a first time dependent range of values for a first time interval and a second time dependent range of values for a second time interval; and
   the step of comparing the sensed first attribute to the first range of acceptable values includes comparing the data for the first attribute stored during the first time interval against the first time dependent range of values and comparing the data for the first attribute stored during the second time interval against the second time dependent range of values.

5. The method of claim 1, further comprising the step of calculating a percentage of time out of range, including calculating the percentage of time that the first attribute is outside the first range of acceptable values.

6. The method of claim 1, further comprising:
   sensing a second attribute of air quality at the first site over a first time period;
   setting a second range of acceptable values for the second attribute;
   setting a second penalty function for the second attribute where points are assessed as function of a difference between the data for the second attribute and the second range of acceptable values;
   comparing the sensed second attribute to the second range of acceptable values and applying the second penalty function to assess a second set of points for each second attribute;
   wherein the step of creating the index value further includes creating an index value that is a function of the second set of points.

7. The method of claim 6, further comprising the step of storing data from the second attribute from the sensing step and wherein the step of comparing the sensed second attribute to the second range of acceptable values includes comparing stored data against the second range of acceptable values.

8. The method of claim 6, further comprising the step of storing data from the second attribute from the sensing step and wherein the step of comparing the sensed data for the second attribute to the second range of acceptable values includes comparing a block of the stored data against the second range of acceptable values and wherein the step of applying the second penalty function includes applying the second penalty function if the entire block of stored data is outside the first range of acceptable values.

9. The method of claim 6, further comprising the step of storing data from the second attribute from the sensing step, wherein:
   the step of storing data from the sensing step includes storing a time stamp;
   the step of setting a second range of acceptable values for the second attribute includes setting a first time dependent range of values for a first time interval and a second time dependent range of values for a second time interval; and
   the step of comparing the sensed second attribute to the second range of acceptable values includes comparing the data for the second attribute stored during the first time interval against the first time dependent range of values and comparing the data for the second attribute stored during the second time interval against the second time dependent range of values.

10. The method of claim 6, further comprising the step of calculating a percentage of time that the first attribute is outside the first range of acceptable values.

11. The method of claim 1 further comprising:
    sensing a first attribute of environmental air quality at a second site;
    comparing the sensed data for the first attribute to the first range of acceptable values and applying the first penalty function to assess a first set of points for the first attribute at the second site; and
    creating an index value that is a function of the first set of points for the first attribute at the second site.

12. The method of claim 1, further comprising the step of outputting data related to the sensed first attribute to a spreadsheet.

13. The method of claim 1, wherein the first attribute of air quality is selected from the group consisting of smoke, carbon monoxide, carbon dioxide, temperature, humidity, toxins, chemicals, particles, volatile organic compounds, and foreign substances.

14. The method of claim 1, wherein the first attribute of air quality is a first attribute of indoor air quality.

15. A system for measuring compliance with building air quality attribute set points, comprising:
    an air quality sensor producing data values for a first attribute; and
    a processor configured to set a first range of acceptable data values for the first attribute, set a first penalty function for the first attribute where points are assessed as a function of a difference that data for the first attribute is outside the first range of acceptable values, compare the sensed data values for the first attribute to the first range of acceptable values and apply the first penalty function to assess a first set of points for each sensed data value for the first attribute, and create an index value that is a function of the first set of points.

16. The system of claim 15, further comprising:
    data storage operably connected to the air quality sensor, the data storage used to store the data values; and wherein the processor compares the data values to the first range of acceptable data values by comparing data values stored in the data storage against the first range of acceptable data values.

17. The system of claim 15, wherein the first attribute is selected from the group consisting of smoke, carbon monoxide, carbon dioxide, temperature, humidity, toxins, chemicals, particles, volatile organic compounds, and foreign substances.

18. The system of claim 15, wherein the first attribute is a first attribute of indoor air quality.

* * * * *

UNITED STATES PATENT AND TRADEMARK OFFICE
CERTIFICATE OF CORRECTION

PATENT NO. : 7,599,815 B2
APPLICATION NO. : 11/368911
DATED : October 6, 2009
INVENTOR(S) : Reichel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-eighth Day of September, 2010

David J. Kappos
*Director of the United States Patent and Trademark Office*